United States Patent
Xiao

(10) Patent No.: US 9,073,217 B2
(45) Date of Patent: Jul. 7, 2015

(54) CLAMPING MECHANISM

(71) Applicants: HONG FU JIN PRECISION INDUSTRY (ShenZhen) CO., LTD., Shenzhen (CN); HON HAI PRECISION INDUSTRY CO., LTD., New Taipei (TW)

(72) Inventor: Xin-Yin Xiao, Shenzhen (CN)

(73) Assignees: HONG FU JIN PRECISION INDUSTRY (ShenZhen) CO., LTD., Shenzhen (CN); HON HAI PRECISION INDUSTRY CO., LTD., New Taipei (TW)

( * ) Notice: Subject to any disclaimer, the term of this patent is extended or adjusted under 35 U.S.C. 154(b) by 0 days.

(21) Appl. No.: 14/333,743

(22) Filed: Jul. 17, 2014

(65) Prior Publication Data

US 2015/0021948 A1 Jan. 22, 2015

(30) Foreign Application Priority Data

Jul. 19, 2013 (CN) .......................... 2013 1 0303558

(51) Int. Cl.
 *B25J 15/00* (2006.01)
 *F16H 19/08* (2006.01)

(52) U.S. Cl.
 CPC ............. *B25J 15/0028* (2013.01); *F16H 19/08* (2013.01); *Y10S 901/36* (2013.01)

(58) Field of Classification Search
 USPC ............. 294/106, 86.4, 104, 115, 116, 119.1, 294/198, 902; 623/64; 901/31, 36, 38, 39
 See application file for complete search history.

(56) References Cited

U.S. PATENT DOCUMENTS

| | | | | |
|---|---|---|---|---|
| 3,147,993 A * | 9/1964 | Broderson et al. | ............ | 294/198 |
| 4,286,380 A * | 9/1981 | Blount | ............ | 29/741 |
| 4,718,709 A * | 1/1988 | Myers et al. | ............ | 294/106 |
| 5,080,415 A * | 1/1992 | Bjornson | ............ | 901/36 |
| 5,092,731 A * | 3/1992 | Jones et al. | ............ | 294/106 |
| 5,378,033 A * | 1/1995 | Guo et al. | ............ | 294/116 |
| 5,711,565 A * | 1/1998 | Smith et al. | ............ | 294/198 |
| 6,217,094 B1 * | 4/2001 | Hanaduka et al. | ............ | 294/106 |
| 7,207,610 B1 * | 4/2007 | Kauppila | ............ | 294/198 |
| 7,980,612 B2 * | 7/2011 | Hall et al. | ............ | 294/106 |

FOREIGN PATENT DOCUMENTS

CN 202895240 U 4/2013

* cited by examiner

*Primary Examiner* — Paul T Chin
(74) *Attorney, Agent, or Firm* — Novak Druce Connolly Bove + Quigg LLP

(57) ABSTRACT

A clamping mechanism includes a driving assembly, a gear assembly and a clamping assembly. The driving assembly includes a driving gear. The gear assembly includes a first slave gear, a second slave gear and a connecting rod which is coupled with the first slave gear and the second slave gear. The first slave gear meshes with the second slave gear. The clamping assembly includes a first clamping member and a second clamping member, which are coupled to the first slave gear and the second slave gear respectively. When the driving gear rotates, the first slave gear and the second slave gear would rotate in opposite directions to enable the first clamping member and the second clamping member to move toward or away from each other, thereby clamping or releasing a workpiece.

9 Claims, 4 Drawing Sheets

CLAMPING MECHANISM

FIELD

The present disclosure relates to clamping mechanisms, and more particularly, to a clamping mechanism coupled to a robot arm.

BACKGROUND

In automated machining processes, a clamping mechanism mounted on a robot arm can be configured for feeding or transferring workpieces. A conventional clamping mechanism is a pneumatic clamping mechanism.

BRIEF DESCRIPTION OF THE DRAWINGS

The components in the drawings are not necessarily drawn to scale, the emphasis instead being placed upon clearly illustrating the principles of the present disclosure. Moreover, in the drawings, like reference numerals designate corresponding parts throughout several views.

DETAILED DESCRIPTION

This disclosure is illustrated by way of example and not by way of limitation in the figures of the accompanying drawings in which like reference numbers indicate similar elements. It should be noted that references to "an" or "one" embodiment in this disclosure are not necessarily to the same embodiment, and such references mean "at least one".

Figure 1:
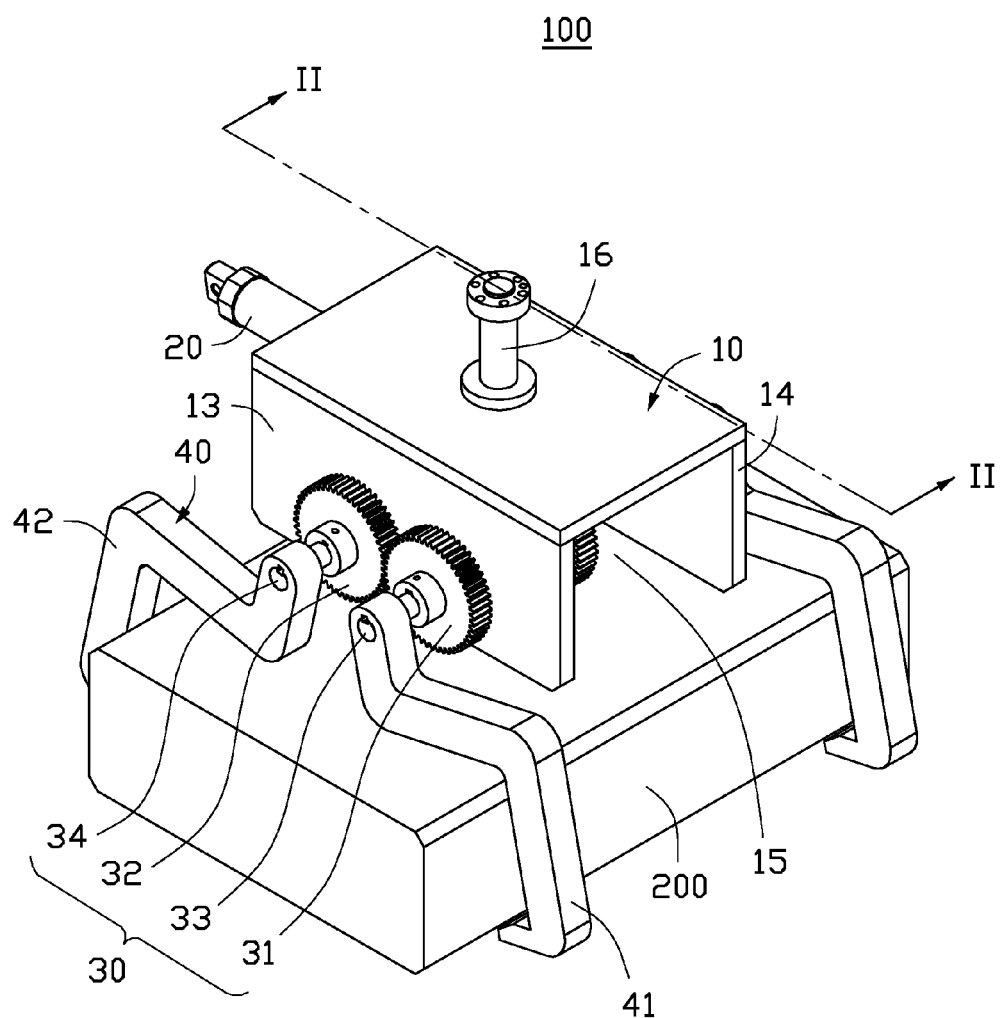
FIG. 1 is a perspective view of a clamping mechanism according to an embodiment of this disclosure.

FIG. 1 illustrates a clamping mechanism 100 according to an illustrated embodiment of this disclosure, which can be configured for clamping a workpiece 200. The clamping mechanism 100 can be coupled with a robot arm (not shown) and controlled by the robot arm to transfer the workpiece 200. The term "coupled" is defined as connected, whether directly or indirectly through intervening components, and is not necessarily limited to physical connections. The connection can be such that the objects are permanently connected or releasably connected.

The clamping mechanism 100 includes a housing 10, a driving assembly 20, a gear assembly 30, and a clamping assembly 40. The driving assembly 20, the gear assembly 30, and the clamping assembly 40 can be mounted on the housing 10. The clamping assembly 40 is coupled with the gear assembly 30, and is configured for clamping and releasing the workpiece 200.

Figure 2:
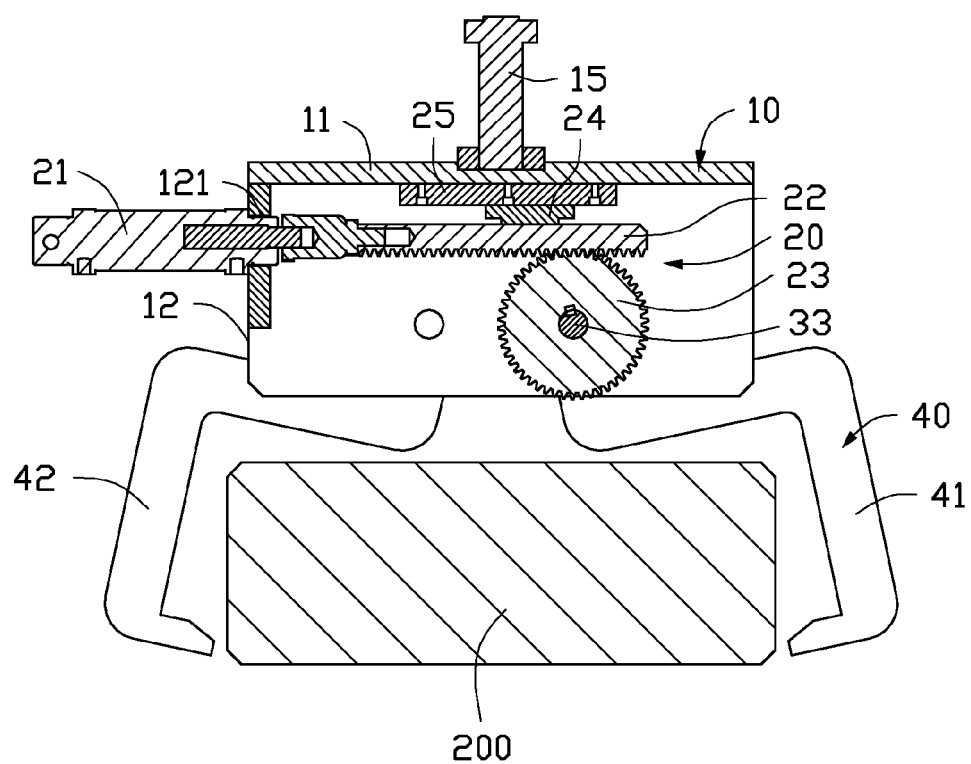
FIG. 2 is a cross-sectional view of the clamping mechanism taken along a line II-II as shown in FIG. 1.

FIG. 2 illustrates a cross-sectional view of the clamping mechanism 100. FIG. 1 and FIG. 2 show that the housing 10 includes a top plate 11, a front plate 12, a first side plate 13 and a second side plate 14 positioned on two sides of the front plate 12. The front plate 12, the first side plate 13, and the second side plate 14 can be rectangular plate and positioned on the one side of the top plate 11 to cooperatively define a receiving space 15. There can be an enamel 16 mounted on the top plate 11, and the enamel 16 is configured for connecting with the robot arm, thereby the clamping mechanism can move with the robot arm. The front plate 12 defines an opening 121.

The driving assembly 20 includes a cylinder 21, a rack 22, a driving gear 23, a sliding knob 24, and a sliding rail 25. The driving assembly 20 rotates the driving gear 23. The cylinder 21 is mounted on the housing 10. One end of the cylinder 21 is positioned outside of the housing 10, and the other end of the cylinder 21 extends into the housing 10 through the opening 121 and couples with the rack 22. The rack 22, the driving gear 23, the sliding knob 24, and the sliding rail 25 are all received in the receiving space 15. One side of the rack 22 away from top plate 11 includes a toothed portion, and the sliding knob 24 secures the other side of the rack 22 adjacent to the top plate 11. The sliding rail 25 is fixedly mounted on the top plate 11. The sliding knob 24 is mounted on the sliding rail 25, and slides on the sliding rail 25. The driving gear 23 meshes with the rack 22. The cylinder 21 drives the rack 22 to slide along a direction parallel with the sliding rail 25, and the driving gear 23 rotates relative to the rack 22 at the same time.

In an alternative embodiment, the driving assembly 20 includes the driving gear 23 and other element, such as a motor, or other driving members. The driving gear 23 is driven by other power resource, as long as the rotational parameters are controlled precisely, such as the speed and the distance of rotation.

The gear assembly 30 includes a first slave gear 31, a second slave gear 32, a driven rod 33, and a connecting rod 34. The first slave gear 31 is mounted on the first side plate 13 and is pivoted on the driven rod 33, and the second slave gear 32 is mounted on the first side plate 13 and is pivoted on the connecting rod 34. The first slave gear 31 is parallel with the second slave gear 32. One end of the driven rod 33 is positioned in the receiving space 15 and is coupled with the driving gear 23. The other end of the driven gear 23 passes through the first side plate 13 and extends out of the receiving space 15 to couple with the first slave gear 31. Thereby, the first slave gear 31 rotates with the driving gear 23. The connecting rod 34 is mounted on the first side plate 13. The second slave gear 32 meshes with the first slave gear 31. When the first slave gear 31 rotates, the second slave gear 32 rotates in an opposite direction.

The clamping assembly 40 includes a first clamping member 41 and a second clamping member 42 coupled to the first slave gear 31 and the second slave gear 32 respectively. The first clamping member 41 is pivoted on the driven rod 33, and the second clamping member 42 is pivoted on the connecting rod 34.

The clamping mechanism 100 includes two gear assemblies 30 and two clamping assemblies 40, and the two clamping assemblies 40 are mounted on the first side plate 13 and the second side plate 14 separately. The number of the gear assembly 30 and the clamping assembly 40 are not limited to this.

In use, the driving gear 23 is driven to rotate by the driving assembly 20, the first slave gear 31 rotates with the driving gear 23, and the second slave gear 32 rotates in an opposite direction. At the same time, the first clamping member 41 and the second clamping member 42 move toward or away from each other to clamp or release the workpiece 200.

Figure 3:
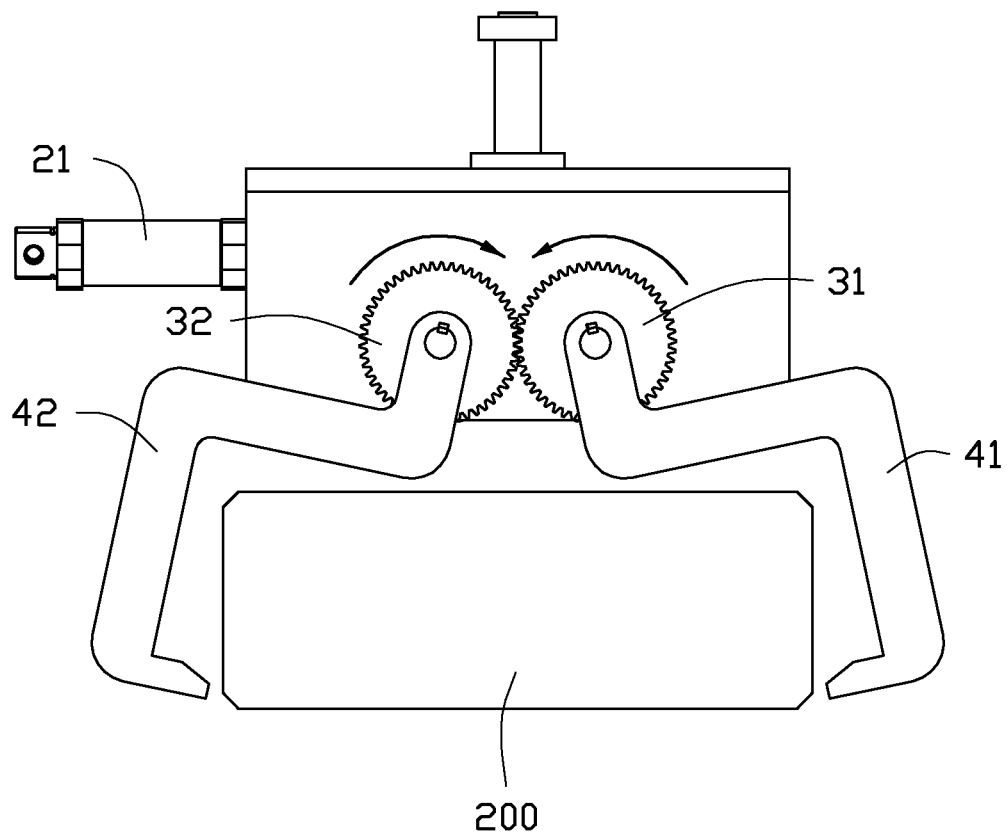
FIG. 3 is a side view of the clamping mechanism as shown in FIG. 1.

FIG. 3 illustrates a side view of the clamping mechanism 100. FIG. 2 and FIG. 3 show that when releasing the workpiece 200, the cylinder 21 withdraws, and the rack 22 moves toward the cylinder 21 and drives the driving gear 23 to rotate counterclockwise. Since both of the first slave gear 31 and the driving gear 23 are coupled to the driven rod 33, the first slave gear 31 can also rotate counterclockwise. At the same time, the second slave gear 32 meshed with the first slave gear 31 rotates clockwise. Therefore, the first clamping member 41 couples with the first slave gear 31 and the second clamping member 42 couples with the second slave gear 32 and move away from each other, thereby the clamping assembly 40 is opened to release or to grasp the workpiece 200.

Figure 4:
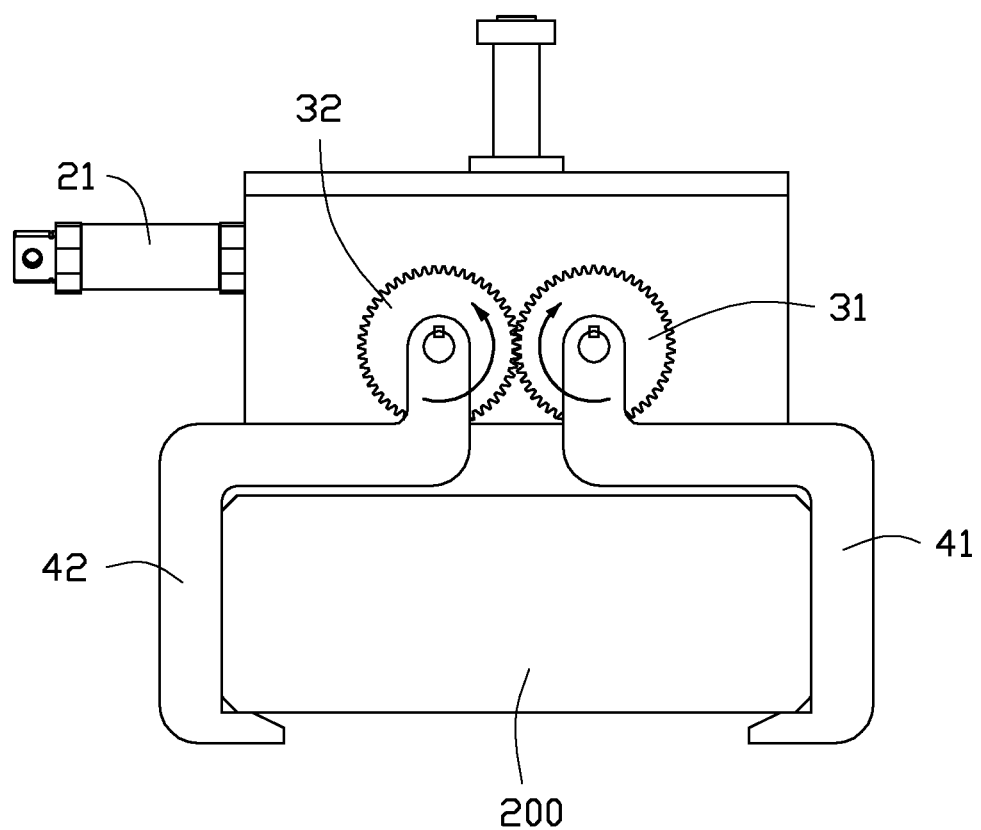
FIG. 4 is a side view of the clamping mechanism as shown in FIG. 1 in another state.

FIG. 4 illustrates the clamping mechanism 100 in another state. FIG. 2 and FIG. 4 show that when clamping the workpiece 200, the cylinder 21 reaches out and the rack 22 moves away from the cylinder 21 and drives the first driving gear 23 to rotate clockwise. Since both of the first slave gear 31 and the driving gear 23 are coupled with the driven rod 33, the first slave gear 31 can also rotate clockwise. At the same time, the second slave gear 32 meshed with the first slave gear 31 rotates anticlockwise. Therefore, the first clamping member 41 coupled with the first slave gear 31 and the second clamping member 42 coupled with the second slave gear 32 move toward each other, thereby the clamping assembly 40 is closed to clamp the workpiece 200.

In an alternative embodiment, the number of the gear assemblies 30 and the clamping assemblies 40 are two or more, thus the clamping mechanism 100 can clamp two or more workpieces at the same time.

Because the first slave gear 31 meshes with the second slave gear 32, the mesh force between the driven gears are large. Furthermore, the rotational parameters of the driven gears are controlled precisely by the driving gear 23, the distance of the movement of the first clamping member 41 and the second clamping member 42 is controlled precisely. Therefore, when the clamping mechanism 100 is used to clamp heavy workpiece, the first clamping member 41 and the second clamping member 42 hold the workpiece tightly, and the heavy workpiece cannot fall from the clamping mechanism 100.

The clamping mechanism 100 drives the clamping members to rotate by a smaller force. The clamping mechanism 100 includes a plurality of assemblies, so it is convenient to replace one assembly. Moreover, the clamping mechanism is simple and low cost.

The present embodiments and their advantages will be understood from the foregoing description. Various changes can be made thereto without departing from the scope of the embodiments. The embodiments described herein are illustrative and should not be construed as limiting the following claims.

What is claimed is:

1. A clamping mechanism, for clamping a workpiece, comprising:
   a housing comprising:
      a top plate,
      a front plate,
      a first side plate, and
      a second side plate, the first side plate and the second side plate positioned at two sides of the front plate, the top plate, the front plate, the first side plate, and the second side plate cooperatively defining a receiving space;
   a driving assembly comprising:
      a driving gear;
      a cylinder,
      a sliding knob,
      a rack coupled with the cylinder and secured by the sliding knob, and
      a sliding rail mounted on the top plate, the sliding knob mounted on the sliding rail and configured to slide on the sliding rail;
   at least one gear assembly, wherein the gear assembly comprises a first slave gear, a second slave gear, and a driven rod, the driven rod is coupled with the driving gear and the first slave gear, and the first slave gear is meshed with the second slave gear; and
   at least one clamping assembly, wherein the clamping assembly comprises a first clamping member coupled with the first slave gear and a second clamping member coupled with the second slave gear; when the driving gear rotates, the first slave gear and the second slave gear would rotate in opposite directions, enable the first clamping member and the second clamping member to move toward or away from each other to clamp or release the workpiece.

2. The clamping mechanism as claimed in claim 1, wherein the gear assembly further comprises a connecting rod mounted on the first side plate; the first slave gear is pivotable on the driven rod, and the second slave gear is pivotable on the connecting rod; and the first slave gear is parallel with the second slave gear.

3. The clamping mechanism as claimed in claim 1, wherein the driving assembly, the gear assembly, and the clamping assembly are mounted on the housing .

4. The clamping mechanism as claimed in claim 1, wherein one end of the cylinder is positioned outside of the housing, and the other end of the cylinder extends into the housing through the front plate.

5. The clamping mechanism as claimed in claim 1, wherein the driving gear is meshed with the rack.

6. The clamping mechanism as claimed in claim 1, wherein the clamping mechanism comprises two gear assemblies and two clamping assemblies, and the two clamping assemblies are mounted on the first side plate and the second side plate separately.

7. A clamping mechanism, comprising:
   a housing comprising a top plate;
   a driving assembly comprising:
      a driving gear,
      a cylinder,
      a sliding knob,
      a rack coupled with the cylinder and secured by the sliding knob, the rack meshed with the driving gear, and
      a sliding rail mounted on the top plate, the sliding knob mounted on the sliding rail and configured to slide on the sliding rail;
   at least one gear assembly, wherein the gear assembly comprises a first slave gear, a second slave gear, and a driven rod, the driven rod is coupled with the driving gear and the first slave gear, and the first slave gear is meshed with the second slave gear; and
   at least one clamping assembly, wherein the clamping assembly comprises a first clamping member coupled with the first slave gear and a second clamping member coupled with the second slave gear.

8. The clamping mechanism as claimed in claim 7, wherein the housing further comprises a front plate, a first side plate, and a second side plate positioned at two sides of the front plate; the top plate, the front plate, the first side plate, and the second side plate cooperatively define a receiving space.

9. The clamping mechanism as claimed in claim 7, wherein the driving assembly, the gear assembly, and the clamping assembly are mounted on the housing.

* * * * *